US009259705B2

(12) United States Patent
Lavric et al.

(10) Patent No.: US 9,259,705 B2
(45) Date of Patent: Feb. 16, 2016

(54) MICROREACTOR DEVICE HAVING AN ESSENTIALLY VERTICAL OR INCLINED UPPER PORTION COMPRISING MEANS FOR COLLECTION AND REMOVAL OF GAS FORMED IN SITU DURING A LIQUID-MEDIUM REACTION AND METHOD

(75) Inventors: Elena Daniela Lavric, Avon (FR); Ronan Tanguy, Grez sur Loing (FR)

(73) Assignee: CORNING INCORPORATED, Corning, NY (US)

( * ) Notice: Subject to any disclaimer, the term of this patent is extended or adjusted under 35 U.S.C. 154(b) by 417 days.

(21) Appl. No.: 13/698,197

(22) PCT Filed: May 26, 2011

(86) PCT No.: PCT/US2011/038024
§ 371 (c)(1),
(2), (4) Date: Nov. 15, 2012

(87) PCT Pub. No.: WO2011/153048
PCT Pub. Date: Dec. 8, 2011

(65) Prior Publication Data
US 2013/0055896 A1    Mar. 7, 2013

(30) Foreign Application Priority Data

May 31, 2010 (FR) ...................... 10 54209

(51) Int. Cl.
*B01D 19/00* (2006.01)
*B01J 19/00* (2006.01)

(52) U.S. Cl.
CPC ......... *B01J 19/0093* (2013.01); *B01D 19/0042* (2013.01); *B01J 2219/00783* (2013.01); *B01J 2219/00837* (2013.01);

(Continued)

(58) Field of Classification Search
CPC .................. B01J 19/00; B01J 19/0093; B01J 2219/0781–2219/00788; B01J 2219/00792; B01J 2219/00797; B01J 2219/00801; B01J 2219/00804; B01J 2219/00873; B01J 2219/00891; B01J 2219/00905; B01D 19/00; B01D 19/0042; B01D 2202/10
See application file for complete search history.

(56) References Cited

U.S. PATENT DOCUMENTS 3,849,095 A   11/1974   Regehr .......................... 55/394
5,976,227 A   11/1999   Lorey ............................. 96/209

(Continued)

FOREIGN PATENT DOCUMENTS

CN    101003012      7/2007
CN    200995173 Y   12/2007

(Continued)

OTHER PUBLICATIONS

CN101003012 Machine Translation.

(Continued)

*Primary Examiner* — Natasha Young
(74) *Attorney, Agent, or Firm* — Gregory V. Bean

(57) ABSTRACT

A microreactor device (100) comprises a microcircuit (110) defining a reaction microchamber (112) containing a liquid and reaction medium (114), in which a chemical reaction takes place generating the gas (116), and is characterized in that the device (100) is disposed substantially vertically or inclined, defining an upper part (120) and a lower part (130) of the microchamber, and in that means (150) are provided in the upper part (120) of the said microcircuit for the in situ collection and removal of the gas formed during the reaction.

10 Claims, 2 Drawing Sheets

(52) U.S. Cl.
CPC .................. *B01J 2219/00873* (2013.01); *B01J 2219/00891* (2013.01); *B01J 2219/00905* (2013.01)

(56) References Cited

U.S. PATENT DOCUMENTS

| | | | |
|---|---|---|---|
| 6,036,749 | A | 3/2000 | Ribeiro et al. .................. 95/261 |
| 6,342,092 | B1 | 1/2002 | Lichon et al. .................. 96/179 |
| 6,652,627 | B1 | 11/2003 | Tonkovich et al. ............. 95/104 |
| 6,830,735 | B1 | 12/2004 | Bouma et al. .................. 422/171 |
| 2004/0120856 | A1 | 6/2004 | Andersson et al. ....... B01L 3/00 |
| 2006/0249020 | A1 | 11/2006 | Tonkovich et al. ............. 95/115 |
| 2007/0100126 | A1 | 5/2007 | Chen et al. |
| 2009/0050121 | A1 | 2/2009 | Holzmann et al. ............ 123/573 |
| 2009/0090215 | A1 | 4/2009 | Shiraishi et al. ................. 75/370 |
| 2009/0100811 | A1 | 4/2009 | Scheckel et al. ................. 55/448 |
| 2009/0143251 | A1 | 6/2009 | Kameyama et al. ............ 506/40 |
| 2009/0145167 | A1 | 6/2009 | Turner et al. .................... 62/606 |
| 2009/0159537 | A1 | 6/2009 | Kemoun ........................ 210/749 |
| 2009/0162864 | A1 | 6/2009 | Kitazawa et al. ................. 435/6 |
| 2009/0208790 | A1 | 8/2009 | Park et al. ........................ 429/21 |
| 2009/0242481 | A1 | 10/2009 | Barents ...................... 210/512.2 |

FOREIGN PATENT DOCUMENTS

| | | |
|---|---|---|
| CN | 201040219 Y | 3/2008 |
| CN | 201150824 Y | 11/2008 |
| CN | 201164766 Y | 12/2008 |
| CN | 201192616 Y | 2/2009 |
| CN | 101406809 A | 4/2009 |
| CN | 101439235 A | 5/2009 |
| DE | 102006002926 | 8/2007 |
| EP | 1068890 | 1/2001 |
| EP | 1080771 | 3/2001 |
| EP | 1527804 | 5/2005 |
| EP | 1547676 | 6/2005 |
| EP | 1946830 | 7/2008 |
| JP | 3-4906 | 10/1991 |
| JP | 2007-335225 | 12/2007 |
| JP | 2008-45786 | 2/2008 |
| JP | 2008-246342 | 10/2008 |
| JP | 2009-110817 | 5/2009 |
| JP | 2009-117174 | 5/2009 |
| JP | 2009-133235 | 6/2009 |
| KR | 10-25007-0022942 | 2/2007 |
| WO | WO 03/098218 A1 * | 11/2003 |
| WO | 2007/094727 | 8/2007 |
| WO | 2008/045138 | 4/2008 |
| WO | 2008/054289 | 5/2008 |
| WO | 2008/122812 | 10/2008 |
| WO | 2008/155875 | 12/2008 |
| WO | 2009/029022 | 3/2009 |
| WO | 2009/030767 | 3/2009 |
| WO | 2009/054776 | 4/2009 |

OTHER PUBLICATIONS

CN201180026203.2 Search Report.
Cui et al; "Fabrication of Microreactors for Dehydrogenation of Cyclohexane to Benzane"; Sensors and Actuators B 71 (2000) 228-231.
Fries et al; "Liquid Mixing in Gas-Liquid Two-Phase Flow by Meandering Microchannels"; Chemical Engineering Science 64 (2009) 1326-1335.
Kreutzer et al; "84a On-Chip Dispersion Measurement in Segmented Flow Through Microchannels"; http://www.nt.ntnu.no/users/skoge/prost/proceedings/aiche-2006/data/papers/P61950.HTM.
Günther et al; "Transport and Reaction in Microscale Segmented Gas-Liquid Flow"; The Royal Society of Chemistry (2004) 278-286.
Mao et al; "Milliseconds Microfluidic Chaotic Bubble Mixer"; Microfluid Nanofluid (2010) 8: 139-144.
International Searching Authority; Written Opinion (PCT/ISA/237); Mail Date: Dec. 13, 2012; pp. 1-6.

* cited by examiner

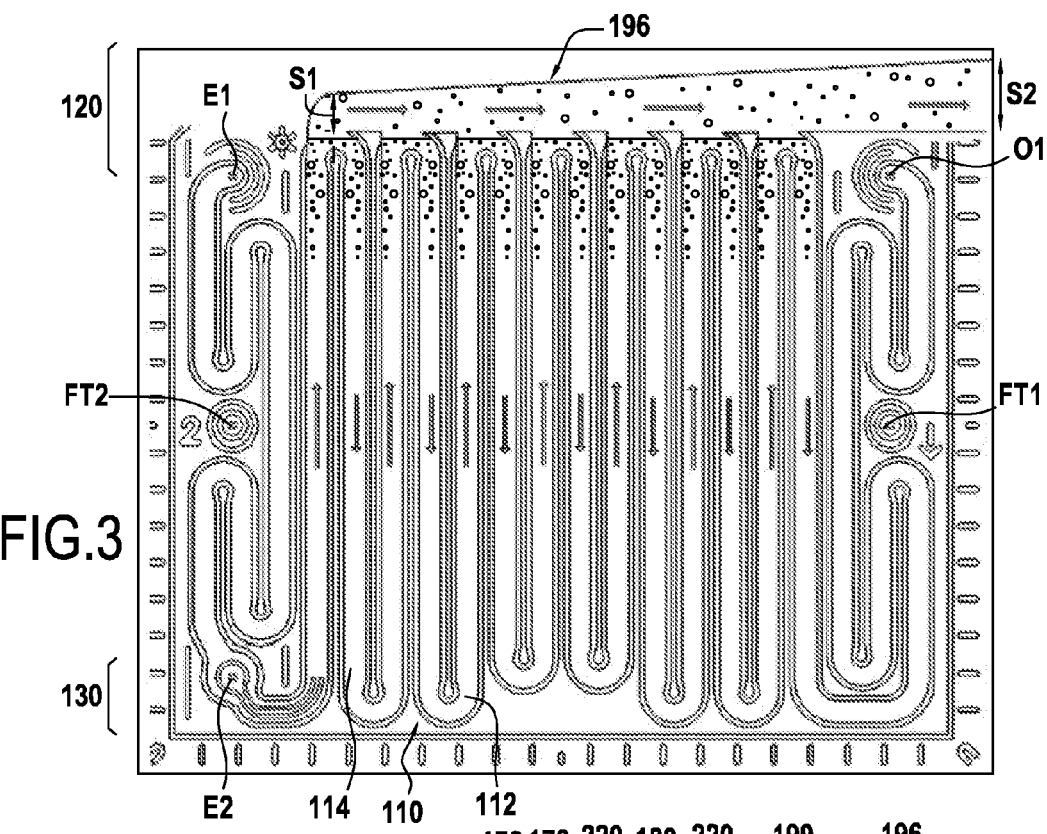
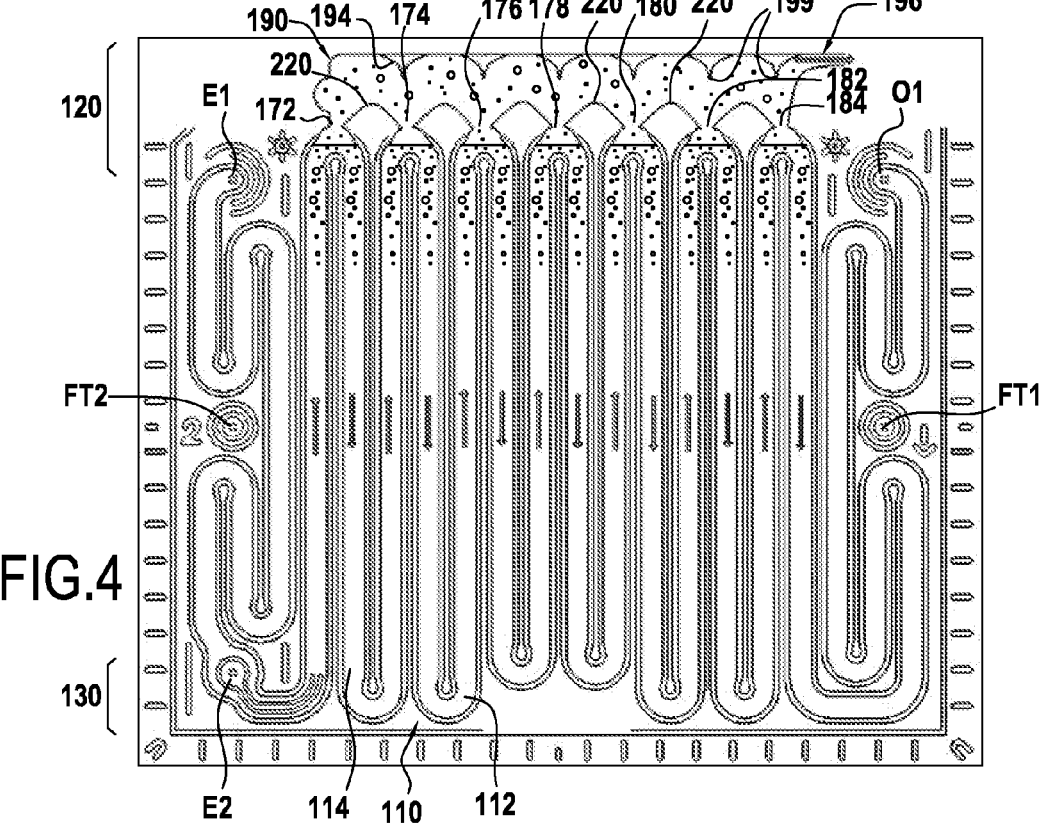

MICROREACTOR DEVICE HAVING AN ESSENTIALLY VERTICAL OR INCLINED UPPER PORTION COMPRISING MEANS FOR COLLECTION AND REMOVAL OF GAS FORMED IN SITU DURING A LIQUID-MEDIUM REACTION AND METHOD

This application is a national stage application of PCT/US2011/38024, now WO 2011/153048, filed on May 26, 2011, and claims the priority of French Priority Serial No. 1054209 filed on May 31, 2010.

FIELD

The present invention relates essentially to a device forming a microreactor having an essentially vertical or inclined upper portion comprising means for collection and disposal of gas formed in situ during a reaction in a liquid medium and a method for separating the gas formed in situ.

BACKGROUND

During many types of chemical reactions in a liquid medium, a gas reaction product may be formed, for example: carbon dioxide ($CO_2$) through chemical reactions such as decarboxylation in a Claisen condensation; and nitrogen in the Sandmeyer reaction of diazo compounds or in the Balz-Schiemann reaction, in the production of arylfluorures, or in reactions of isocyanates and thioisocyanates.

Various methods have been proposed for separating and removing gas from the liquid such as, for example:

a) a method of degassing with a separating film or membrane described, for example, in U.S. Pat. No. 6,342,092, U.S. 2009/090215 A1, U.S. 2009/208790 A1, U.S. 2009/0162864 A1, U.S. 2009/0143251 or allowing selective passage of either the gas or the liquid;

b) a degassing method using an adsorbent having an absorption capacity for the gas or the liquid, see for example EP 1080771, U.S. 2006/0,249,020;

c) a method of degassing by decompression, see, e.g., WO 2008/155 175, EP 2089131, U.S. 2009/0159537, U.S. 2009/0145167;

d) a method of degassing by heating, for example see TW 2006/19586;

e) a method of degassing by mechanical or inertial methods such as centrifugal separators or by utilizing a cyclone, for example, WO 2007/94727; WO 2009/929022; U.S. 2009/0242481, EP 1068990, U.S. Pat. No. 6,036,749, U.S. Pat. No. 5,976,227, U.S. Pat. No. 3,849,095, U.S. 2009/0100811, U.S. 2009/0050121; and f) a trapping method, for example EP 2024052, U.S. Pat. No. 6,830,735.

In EP 1527804 and U.S. 2009/090215 A1, the separation of a byproduct gas is carried out continuously in an outer pipe having a portion with a larger section. The device for gas-liquid separation is installed between the units of a multi-step or multi-unit process, in an intermediate section of straight pipe having sufficient length to complete the immediately previous reaction, and which conveys the liquid reaction mixture from the second unit from the first mixing unit while continuously removing gas by-product generated by immediately previous reaction (see FIG. 2 of this document).

In WO 2009/054176, any inert gases and uncondensed vapors are continuously discharged from a condenser through openings made in a central channel, see FIG. 3.

U.S. Pat. No. 7,604,781 B2 discloses microcircuit reaction apparatus capable of separating liquid and gas phases and a method of using the apparatus in which the reactant stream passes through a separation zone 510 that widens before encountering a coalescing element 508 formed for example by fibers or foam (column 11, lines 6-10 of this document). This separation zone, which may contain a separation plate 515 (column 11, lines 9-11), is positioned at the end of the apparatus, before the exit, which constitutes a different technical solution than that of the invention described herein below.

U.S. 2009/0,282,978 discloses a separator for microfluidic multi-phase separations based on membranes, see in particular FIG. 3.

U.S. Pat. No. 6,637,463 discloses a microfluidic circuit comprising a plurality of microfluidic flow channels which are subdivided, see FIGS. 1-8. This circuit includes a microfluidic structure for separating gas bubbles from a liquid, comprising an extraction chamber in fluid communication with a drainage chamber, the fluid traveling through the extraction chamber to the drainage chamber in a first direction with a system of upper tanks and lower tanks necessitating a complicated design and manufacturing process.

SUMMARY OF THE INVENTION

The present invention aims to provide a microreactor or microfluidic device capable of separating gas generated by a reaction in a liquid medium in situ, or, similarly, of separating liquid generated by a reaction in a gas medium in situ.

The present invention also aims to allow for continuous in situ collection of the gas formed during a reaction in a liquid medium and continuous in situ removal of the collected gas, or vice versa, namely, continuous in situ collection of the liquid formed during a reaction in a gas medium, and continuous in situ removal of the collected gas.

The present invention also aims to provide a novel structure of a microreactor for separating gas from a liquid reaction, or liquid from a gas reaction, having a simple design, allowing use of existing microreactor structures and fabrication techniques with very little modification, resulting in an inexpensive device that can successfully be used industrially and commercially.

The present invention solves for the first time the technical problems mentioned above in a simple, inexpensive manner that can be used commercially and at industrial scale.

According to one aspect, the present invention provides a method of in situ separation of the gas formed in a microreactor device having a microcircuit defining a micro-reaction chamber containing a liquid reaction medium, in which a chemical reaction generates said gas, characterized in that said device has substantially vertical or inclined orientation, thereby defining an upper and a lower part of the microchamber, in which upper part means are provided for the in situ collection and removal of the gas formed during the reaction.

According to another particular embodiment, the microcircuit comprises at least one or more upper bends, the said method being characterized in that the collecting means are disposed in the vicinity of at least one said bend, in particular in the vicinity of each bend, for the in situ and continuous collection and removal of the gas formed.

According to another particular embodiment, this method is characterized in that the means for collecting and removing the gas formed are integrated in the device forming microreactor.

According to a further particular embodiment, this method is characterized in that each bend is provided to comprise at least one opening communicating with the collecting means which are shaped to form an upper prolongation of the circuit in the upper part.

According to another particular embodiment, this method is characterized in that at least some of the bends, and in particular all the bends, are provided to comprise an upper prolongation, said prolongations communicating with one another via a common duct for removing the gas formed during the reaction.

According to a particular alternative embodiment, this method is characterized in that the upper prolongation is provided to comprise a flared part defining a chamber for collecting and separating the gas from the liquid reaction medium.

According to a particular feature, this method provides that the collecting and separating chamber has a substantially spherical shape.

According to another particular embodiment, in which the bends are defined by an upstream fluid flow arm and a downstream fluid flow arm, the method is characterized in that the upstream fluid flow arm is provided to comprise an upstream wall opposed to the bend in continuity with an upstream wall of the prolongation of the means for collecting and removing the gas formed during the reaction.

According to a further particular embodiment, this method is characterized in that the common duct for removing the gas formed during the reaction is provided to have a cross section which increases in the downward stream direction of the device.

According to another particular embodiment, this method is characterized in that the common duct for removing the gas formed during the reaction is provided also to have an upper wall comprising sections rounded in an arch, two successive rounded sections defining a pointed part substantially facing the openings communicating with the collecting means.

According to a particular embodiment, this method is further characterized in that the gas collecting means are provided to comprise a chamber having a cross section that is wider than the microcircuit at the bend.

According to a further particular embodiment, this method is characterized in that at least one surface treatment of the microcircuit is carried out, at least at each upper bend to make this surface hydrophobic or organophobic so that the liquid reaction medium does not, or substantially does not, adhere thereto.

According to another particular embodiment, this method is characterized in that the wall common to two successive bends is provided to comprise at least one deflector in its upper part having the function of at least partly intercepting the drops entrained by the gas phase in the nascent region thereof.

According to a particular alternative embodiment, this method is characterized in that the deflector is made to have a substantially mushroom shape or a similar functional shape.

According to a second aspect, the present invention provides a device forming a microreactor comprising a microcircuit defining a reaction microchamber containing a liquid reaction medium, in which a chemical reaction takes place generating gas, characterized in that the device is disposed substantially vertically or inclined, thereby defining an upper part and a lower part of the microchamber, and in that means are provided in the upper part of the said microcircuit for the in situ collection and removal of the gas formed during the reaction.

According to a particular embodiment, this device is characterized in that the microcircuit comprises at least one or more upper bends and in that the collecting means are disposed in the vicinity of at least one said bend, in particular in the vicinity of each bend, for the in situ and continuous collection and removal of the gas formed.

According to another particular embodiment, this device is characterized in that the means for collecting and removing the gas formed are integrated in the device.

According to a further particular embodiment, this device is characterized in that each bend comprises at least one opening communicating with the collecting means which are shaped to form an upper prolongation of the circuit in the upper part.

According to another particular embodiment, this device is characterized in that at least some of the bends, and in particular all the bends, comprise an upper prolongation, said prolongations communicating with one another via a common duct for removing the gas formed during the reaction.

According to a particular alternative embodiment, this device is characterized in that the upper prolongation comprises a flared part defining a chamber for collecting and separating the gas from the liquid reaction medium.

According to a particular feature, the collecting and separating chamber has a substantially spherical shape.

According to another particular embodiment, in which the bends are defined by an upstream fluid flow arm and a downstream fluid flow arm, the device is characterized in that the upstream fluid flow arm comprises an upstream wall opposed to the bend in continuity with an upstream wall of the prolongation of the abovementioned means for collecting and removing the gas formed during the reaction.

According to a further particular embodiment, this device is characterized in that the common duct for removing the gas formed during the reaction has a cross section which increases in the downward stream direction of the device.

According to another particular embodiment, this device is characterized in that the abovementioned common duct for removing the gas formed during the reaction also has an upper wall comprising sections rounded in an arch, two successive rounded sections defining a pointed part substantially facing the abovementioned openings communicating with the abovementioned collecting means.

According to a particular embodiment, this device is further characterized in that the abovementioned gas collecting means comprise a chamber having a cross section that is wider than the abovementioned microcircuit at the abovementioned bend.

According to another particular embodiment, this device is characterized in that the surface of the microcircuit, at least at each abovementioned upper bend, is treated to be hydrophobic or organophobic so that the liquid reaction medium does not adhere thereto.

According to another particular embodiment, this device is characterized in that the wall common to two successive bends comprises at least one deflector in its upper part having the function of at least partly intercepting the drops entrained by the gas phase in the nascent region thereof.

According to a particular alternative embodiment, this device is characterized in that the deflector has a substantially mushroom shape or a similar functional shape.

In the context of the invention, the terms "disposed substantially vertically or inclined" or in a "substantially vertical or inclined orientation" mean that the device may be disposed vertically, or in a position close to the vertical position, or even in a position inclined with regard to the horizontal, in order to promote the ascension, hence the separation, of the gas bubbles generated in the liquid reaction medium.

Other objects, features and advantages of the invention will appear clearly from the explanatory description that follows with reference to several embodiments of the invention, currently preferred, provided simply for illustration, and which therefore does not in any way limit the scope of the invention.

BRIEF DESCRIPTION OF THE FIGURES

FIG. 3 shows a third embodiment of a device forming a microreactor according to the present invention for continuous gas-liquid separation, also disposed substantially vertically, according to an axial longitudinal cross-section; and FIG. 4 shows a fourth embodiment of a device forming a microreactor according to the present invention, also disposed substantially vertically, according to an axial longitudinal section.

DETAILED DESCRIPTION

Figure 1:
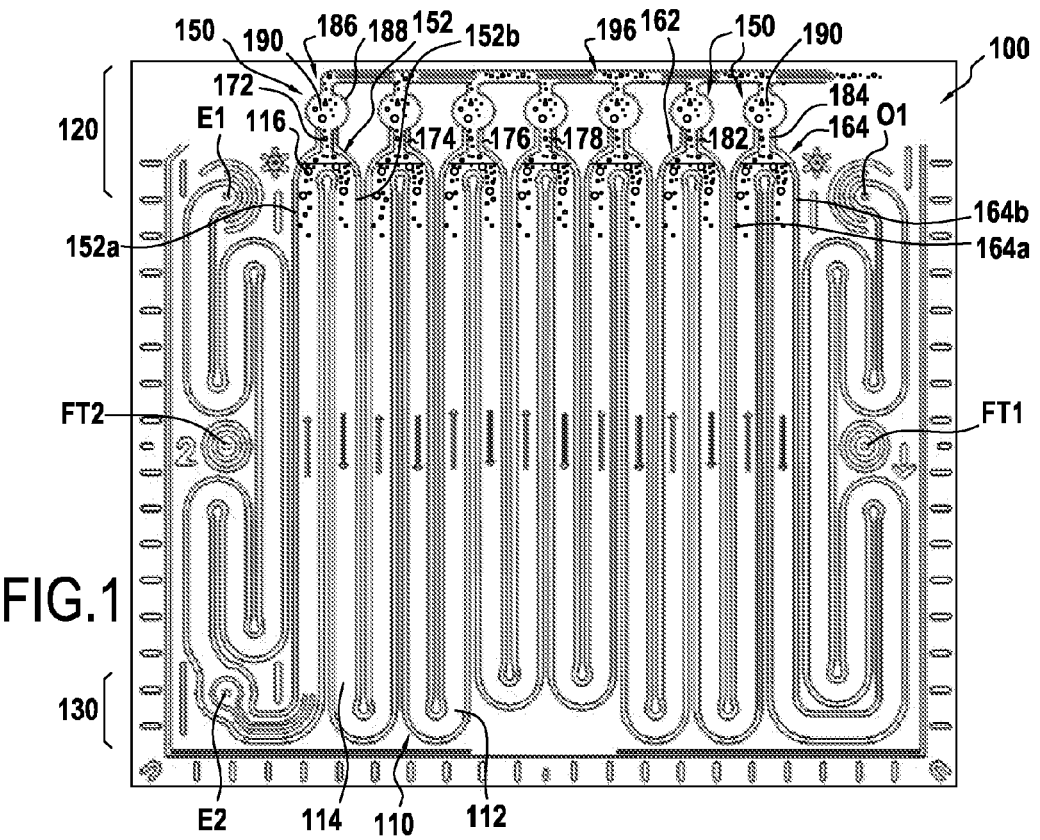
FIG. 1 shows a first embodiment of a device forming a microreactor according to the present invention for continuous gas-liquid separation, disposed here substantially vertically, according to an axial longitudinal cross-section.

With reference to FIG. 1, the present invention provides a device forming a microreactor 100 comprising a microcircuit 110 defining at least one reaction microchamber 112 containing a liquid reaction medium 114, in which a chemical reaction takes place generating gas 116.

The microcircuit 110 may comprise at least one first feed inlet E1 of at least one first liquid reaction medium and at least one second feed inlet E2 of a second liquid reaction medium having at least one component reacting chemically with at least one component of the first liquid reaction medium, the chemical reaction generating said gas. It may here relate to all types of chemical reactions well known to a person skilled in the art, as explained at the end of the description.

The liquid reaction medium is obviously removed via at least one outlet O1.

As is well known to a person skilled in the art, at least one heat transfer fluid inlet FT1 may also commonly be provided, supplied at a predefined temperature to control the chemical reaction, and either in co-flow, or in counterflow with regard to the global flow direction of the liquid reaction medium, as clearly shown by the arrows in particular in FIG. 1, this heat transfer fluid being removed via at least one outlet FT2.

According to the invention, this device is characterized in that the device 100 is disposed substantially vertically or inclined, as shown, defining an upper part 120 and a lower part 130 of the microchamber, and in that it comprises in the upper part 120 of said microcircuit 110 means 150 for the in situ collection, separation and removal of the gas 116 formed during the reaction.

According to a particular embodiment, this device 100 is characterized in that the microcircuit comprises at least one or more upper bends such as 152, 154, 156, 158, 160, 162, 164 and in that the collecting means 150 are located in the vicinity of at least one said bend, in particular in the vicinity of each bend, as shown, for the in situ and continuous collection, separation and removal of the gas 116 formed, as clearly understood by a person skilled in the art.

According to another particular embodiment, this device 100 is characterized in that the means 150 for collecting, separating and removing the gas formed are integrated in the device, as shown in FIG. 1.

According to a further particular embodiment, this device 100 is characterized in that each bend 152, 154, 156, 158, 160, 162, 164 comprises at least one opening 172, 174, 176, 178, 180, 182, 184, communicating with the collecting means 150, which are shaped to form an upper prolongation 186 of the circuit in the upper part 120.

According to another particular embodiment, this device 100 is characterized in that at least some of the bends, and in particular all the bends, comprise an upper prolongation such as 186, the said prolongations communicating with one another via a common duct 196 for removal of the gas 116 formed during the reaction.

According to a particular alternative embodiment, this device 100 is characterized in that the upper prolongation 186 comprises at least one bend, or at each bend, as shown, a flared part 188 defining a chamber 190 for collecting and separating the gas 116 from the liquid reaction medium 114, thereby communicating with the chamber 112 of the microcircuit 110.

According to another particular feature, the collecting and separating chamber 190 has a substantially spherical shape, as shown in FIG. 1.

Figure 2:
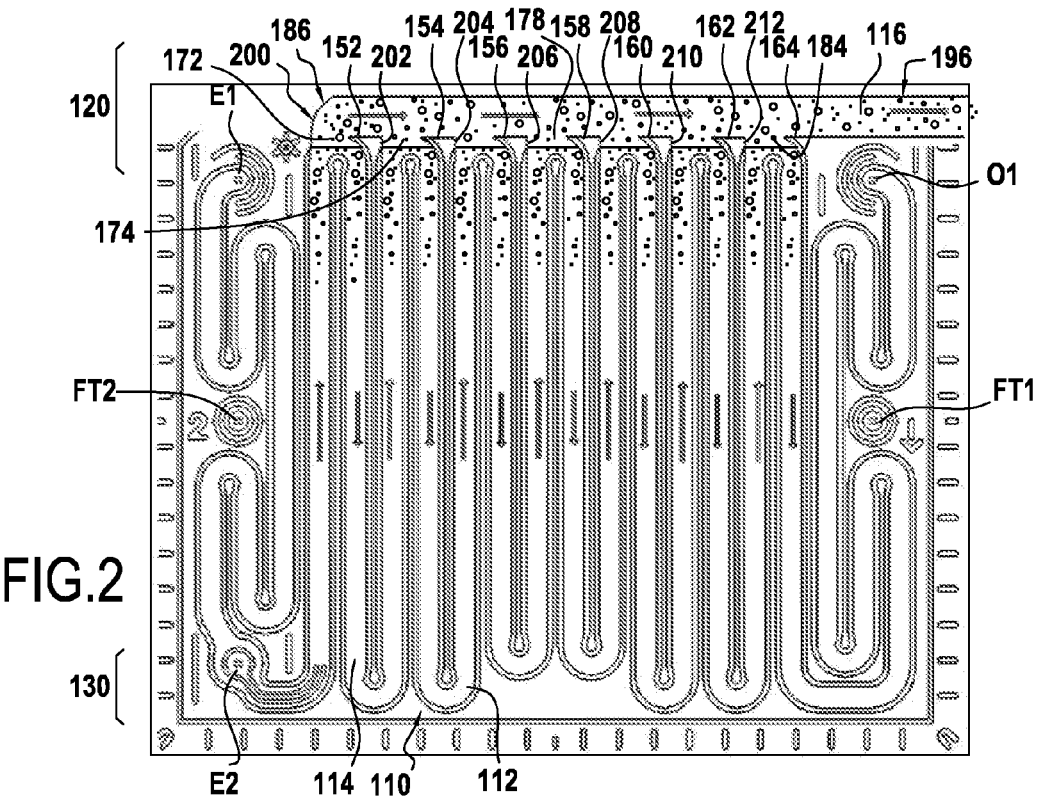
FIG. 2 shows a second embodiment of a device forming a microreactor according to the present invention for continuous gas-liquid separation, also disposed substantially vertically, according to an axial longitudinal cross-section.

According to another particular embodiment, shown in FIG. 2, for which the same reference numerals are repeated, the bends 152, 154, 156, 158, 160, 162, 164 are defined by an upstream fluid flow arm 152a, 154a, 156a, 158a, 160a, 162a, 164a and a downstream fluid flow arm 152b, 154b, 156b, 158b, 160b, 162b, 164b, and the device here is characterized in that the upstream fluid flow arm 152a, 154a, 156a, 158a, 160a, 162a, 164a comprises an upstream wall at the bend 152, 154, 156, 158, 160, 162, 164 in continuity with an upstream wall such as 200, 202, 204, 206, 208, 210, 212 of the prolongation 186 of the means 150 for collecting, separating and removing the gas 116 formed during the reaction. In other words, the opening 172, 174, 176, 178, 180, 182, 184 is much larger, here having a dimension greater than the width of the upstream arm, thanks to the elimination of the upstream inclined part of the bend, as shown very clearly by comparing FIGS. 2 and 1, thereby facilitating the removal and recovery of the gas 116.

According to a further particular embodiment, shown in FIG. 3, for which the same reference numerals are repeated, this device is characterized in that the common duct 196 for removing the gas 116 formed during the reaction has a cross-section that increases in the downward stream direction of the device, as clearly shown in FIG. 3. The cross-section S2 downstream may for example be at least twice the cross-section S1 upstream.

According to another particular embodiment, shown in FIG. 4, for which the same reference numerals are repeated, this device is characterized in that the common duct 196 for removing the gas 116 formed during the reaction also has an upper wall comprising sections 198 rounded in an arch, two successive rounded sections defining a pointed part 199 substantially facing the abovementioned openings 172, 174, etc. communicating with the abovementioned collecting means 150.

According to a particular embodiment, this device is further characterized in that the gas collecting means comprise a chamber 190 having a cross-section that is wider than the abovementioned microcircuit 110 at the abovementioned bend, such as 152.

According to a further particular embodiment, this device is characterized in that the surface of the microcircuit, at least at each abovementioned upper bend, is treated by products well known to a person skilled in the art to have a hydrophobic or organophobic surface so that the liquid reaction medium does not, or substantially does not, adhere thereto.

According to another particular embodiment, shown in FIG. 4, this device is characterized in that the wall common to two successive bends comprises at least one deflector 220 in its upper part having the function of at least partly intercepting the drops of liquid medium entrained by the gas phase in the nascent region thereof.

According to a particular alternative embodiment, this device 100 may be further characterized in that the deflector 220 has a substantially mushroom shape, as shown in FIG. 4; or a similar functional shape.

It can be understood that thanks to the invention, the method for in situ separation of the gas formed during the reaction as previously defined is clearly implemented, and accordingly the gas is removed continuously from the liquid reaction medium inside the microreactor. Thus, the presence of the by-product gas would not significantly affect the heat transfers, and the productivity per m3 of the reactor will be increased. In fact, a lower heat transfer coefficient would give rise to a higher temperature increasing the risk of local overheating, the formation of undesirable side reactions and/or the thermal physical degradation of the products, which may lead to deposits on the surface, thereby further degrading the heat transfer coefficient.

By removing the gas in situ, the productivity is increased, and thus it is less necessary to use many fluid modules for the same production. In other words, the productivity per m3 of the reactor is increased. Since the flow rate of the fluid supplied is constant, the presence of gas in the reaction microcircuit would increase the velocity and decrease the residence time. This would raise the need to use more micro fluidic modules to obtain the desired final conversion. Furthermore, if the by-product gas was separated between the fluid modules, as in the prior art, this would add to the complexity of the reactor, due to the use of a distinct container constituting a gas/liquid separator, with the attendant complications such as additional pressure drop, metal connector, etc.

It can therefore be concluded that the present invention is an inventive solution, not obvious to a person skilled in the art, which improves the fabrication method without having to use additional internal elements in the microfluidic module.

The embodiments shown in FIGS. 1 to 4 constitute an integral part of the present invention and any feature, which appears to be novel with regard to any prior art, is claimed as such in its form and in its general function.

It should be observed that thanks to the structures of the device shown in FIGS. 1 to 4, it is possible to feed liquids and gases at low velocities and at high velocities, the gas bubbles formed leave the reaction microcircuit and, despite the narrow width, flow via the common duct 190 to the upper part of the reaction microcircuit. For higher gas flow rates, the coalescence of the bubbles does not prevent the removal of the gas, in particular by using a wider common duct 196 which may be flared as shown in FIG. 3.

It results that with the embodiments shown in FIGS. 1 to 4, for example, satisfactory gas-liquid separation efficiencies can be obtained both at low and high gas and liquid flow rates.

The invention thereby serves to carry out any type of reaction in a microfluidic device 100.

The separation of a gas from a liquid medium has been described, but obviously the reverse is also possible in this same device.

As previously outlined any type of chemical reaction resulting in a mixture of a liquid phase and a gas phase can be carried out with the invention method and with the invention device.

What is claimed is:

1. A microreactor device (100) comprising a microcircuit (110) defining a reaction microchamber (112) for containing a liquid reaction medium (114), in which a chemical reaction takes place generating gas (116), characterized in that, the device (100) is disposed substantially vertically or inclined, thereby defining an upper part (120) and a lower part (130) of the microchamber, the microcircuit (100) comprises upper bends, each bend comprising at least one opening shaped to form an upper prolongation (186) of the circuit in the upper part, the said prolongations communicating with one another via a common duct (196) for the in situ collection and removal of the gas formed during the reaction.

2. Device according to claim 1, characterized in that the upper prolongation (186) comprises a flared part (188) defining a chamber (190) for collecting and separating the gas from the liquid reaction medium.

3. Device according to claim 2, characterized in that the collecting chamber (190) has a substantially spherical shape.

4. Device according to claim 1, in which the bends are defined by an upstream fluid flow arm and a downstream fluid flow arm characterized in that the upstream fluid flow arm comprises an upstream wall opposite to the bend in continuity with an upstream wall of the prolongation (186) of the means (150) for collecting and removing the gas formed during the reaction.

5. Device according to claim 1, characterized in that the common duct (196) for removing the gas formed during the reaction has a cross section which increases in the downstream direction of the device.

6. Device according to claim 1, characterized in that the common duct (196) for removing the gas formed during the reaction also has an upper wall comprising sections rounded in an arch (198), two successive rounded sections defining a pointed part (199) substantially facing the openings communicating with the collecting means (150).

7. Device according to claim 1, characterized in that the upper prolongations each comprise a chamber (190) having a cross section that is wider than the microcircuit at the bend.

8. Device according to claim 1, characterized in that the surface of the microcircuit (110), at least at each upper bend, is treated to make this surface hydrophobic or organophobic so that the liquid reaction medium does not, or substantially does not, adhere thereto.

9. Device according to claim 1, characterized in that a wall common to two successive bends comprises at least one deflector (220) in its upper part having the function of at least partly intercepting the drops entrained by the gas phase in the nascent region thereof.

10. Device according to claim 9, characterized in that the deflector has a substantially mushroom shape.

* * * * *